US012335706B2

(12) United States Patent
Tang et al.

(10) Patent No.: US 12,335,706 B2
(45) Date of Patent: Jun. 17, 2025

(54) MULTIFUNCTIONAL SOUND DEVICE

(71) Applicant: AAC Microtech (Changzhou) Co., Ltd., Changzhou (CN)

(72) Inventors: Yun Tang, Shenzhen (CN); Lubin Mao, Shenzhen (CN); Jie Ma, Shenzhen (CN); Ziang Li, Shenzhen (CN); Xingzhi Huang, Shenzhen (CN); Wei Song, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 209 days.

(21) Appl. No.: 18/092,931

(22) Filed: Jan. 4, 2023

(65) Prior Publication Data

US 2024/0089662 A1 Mar. 14, 2024

Related U.S. Application Data

(63) Continuation of application No. PCT/CN2022/121383, filed on Sep. 26, 2022.

(30) Foreign Application Priority Data

Sep. 8, 2022 (CN) ......................... 202211096706.3

(51) Int. Cl.

*H04R 25/00* (2006.01)
*H04R 1/02* (2006.01)
*H04R 9/02* (2006.01)

(52) U.S. Cl.

CPC ............... *H04R 9/025* (2013.01); *H04R 1/02* (2013.01); *H04R 2400/11* (2013.01)

(58) Field of Classification Search

CPC .............. H04R 1/2811; H04R 2207/00; H04R 2499/11; H04R 7/127; H04R 9/025; H04R 9/046; H04R 9/06; H04R 31/003; H04R 7/20

USPC .......................................................... 381/412

See application file for complete search history.

(56) References Cited

U.S. PATENT DOCUMENTS

2015/0023506 A1* 1/2015 Jansson .................... H04R 3/12 381/17

* cited by examiner

*Primary Examiner* — Phylesha Dabney
(74) *Attorney, Agent, or Firm* — Wiersch Law Group

(57) ABSTRACT

A multifunctional sound device includes a housing, a sound unit, a vibrator, and coils. The housing includes an accommodating cavity, and the sound unit is accommodated in the accommodating cavity and is fixedly connected to the housing. The sound unit includes a frame, a vibration system, and a magnetic circuit system. The vibration system is disposed in the frame, and the magnetic circuit system drives the vibration system to reciprocally vibrate and generate sound along a first direction. The sound unit and the vibrator are assembled in the housing and share one magnetic system, which saves space and greatly reduces occupied space. Moreover, the magnetic circuit system interacts with the coils to drive the vibrator to vibrate in the second direction and the third direction, thereby enhancing vibration effect.

9 Claims, 6 Drawing Sheets

MULTIFUNCTIONAL SOUND DEVICE

TECHNICAL FIELD

The present disclosure relates to a technical field of electroacoustic conversion, and in particular to a multifunctional sound device.

BACKGROUND

With the rapid development of consumer electronics industry, in particular to smart phones, end consumers have higher demands for device experience. Excepting vision, demands for hearing experience and touching experience further become higher and higher.

In the related art, performance improvement of a speaker module and a motor is generally achieved through increasing a size of a product. However, internal space of current electronic devices is becoming more compact, and batteries, main boards, and cameras in which occupy larger and larger space, therefore sizes of the speaker module and the motor cannot be increased and even need to be decreased, which is further conflict with the performance improvement. Therefore, mobile phone manufacturers ask for more requirements of smaller occupied space of the speaker module and the motor and further put forward higher requirements for vibration function of the motor.

Therefore, it is necessary to provide a speaker and a motor occupying a smaller space and having a stronger vibration function.

SUMMARY

The present disclosure aims to provide a multifunctional sound device to solve the technical problem that a speaker and a motor occupying a smaller space and having a stronger vibration function are provided.

In order to achieve above aims, the present disclosure provides the multifunctional sound device, including a housing, a sound unit, a vibrator, and coils. The housing includes an accommodating cavity, and the sound unit is accommodated in the accommodating cavity and is fixedly connected to the housing. The sound unit includes a frame, a vibration system, and a magnetic circuit system. The vibration system is disposed in the frame, and the magnetic circuit system drives the vibration system to reciprocally vibrate and generate sound along a first direction, where the magnetic circuit system comprises a magnetic gap. The vibrator is suspended in the accommodating cavity and disposed on one side, distal from the vibration system, of the magnetic circuit system, and the coils are assembled to the vibrator. The magnetic circuit system interacts with the coils to drive the vibrator to vibrate in a second direction and a third direction, the second direction is perpendicular to the third direction, and the second direction and the third direction are perpendicular to the first direction.

Furthermore, the multifunctional sound device further includes elastic components, and the elastic components are respectively connected to the vibrator and the housing. Each of the elastic components includes a bearing portion and two elastic portions, the bearing portion bears the vibrator, and the two elastic portions are fixedly connected to the bearing portion. The two elastic portions are respectively disposed at two opposite ends of the vibrator, and the two elastic portions are elastically deformed when the vibrator vibrates.

Furthermore, each of the elastic portions includes a first connecting arm, a second connecting arm, and a third connecting arm. The first connecting arm is fixedly connected to the housing, the second connecting arm is fixedly connected to the vibrator, and two ends of the third connecting arm are respectively and fixedly connected to the first connecting arm and the second connecting arm. The first connecting arm, the second connecting arm, and the third connecting arm surround a periphery of the vibrator.

Furthermore, avoidance holes are respectively defined on the elastic portions. Impact portions are disposed on the vibrator, where the impact portions are matched with the avoidance holes. The impact portions pass through the avoidance holes when the vibrator vibrates.

Furthermore, a first avoiding hole is defined on the bearing portion, and a second avoiding hole is defined on the vibrator, where the second avoiding hole is disposed opposite to the first avoiding hole. A supporting portion is formed through protruding from the housing toward a direction of the vibrator, and the supporting portion sequentially penetrates through the first avoiding hole and the second avoiding hole and is fixed to the magnetic circuit system.

Furthermore, the multifunctional sound device further includes a fixing component, the fixing component is accommodated in the second avoiding hole, and the supporting portion is fixed to the magnetic circuit system through the fixing component.

Furthermore, a number of the coils is two. The vibrator includes a main body portion, two side wall portions, and two mass blocks. The main body portion is assembled to the bearing portion, the two side wall portions are fixed at two opposite ends of the main body portion, and the two mass blocks are fixedly connected to the main body portion. The two mass blocks are disposed at intervals between the two side wall portions, two mounting grooves are defined on the main body portion at intervals, and the two mounting grooves are disposed at two opposite sides of the second avoiding hole. The coils are one-to-one disposed in the mounting grooves.

Furthermore, the coils are racetrack-shaped coils, and included angles respectively exist between an extension direction of a long edge of each of the coils with the second direction and the extension direction of the long edge of each of the coils with the third direction.

Furthermore, the coils are opposite to the magnetic gap and are spaced apart from the magnetic gap along the first direction.

Furthermore, the magnetic circuit system includes a primary magnet and a secondary magnet, the secondary magnet is spaced apart from the primary magnet. The primary magnet includes an upper magnet and a lower magnet opposite to the upper magnet, and magnetic poles of ends, close to each other, of the upper magnet and the lower magnet are the same. The magnetic circuit system further includes a primary pole core and a secondary pole core, two sides of the primary pole core are respectively and fixedly connected to the upper magnet and the lower magnet, and the secondary pole core is respectively and fixedly connected to the frame the secondary magnet. A magnetic pole direction of the secondary magnet is opposite to a magnetic pole direction of the lower magnet, and the magnetic pole direction of the secondary magnet is the same as a magnetic pole direction of the upper magnet.

Beneficial effects of the present disclosure are that, the sound unit and the vibrator are assembled in the housing and share one magnetic system, which saves space and greatly reduces occupied space. Moreover, the magnetic circuit system interacts with the coils to drive the vibrator to vibrate in the second direction and the third direction, thereby enhancing vibration effect.

DETAILED DESCRIPTION OF EMBODIMENTS

Figure 1:
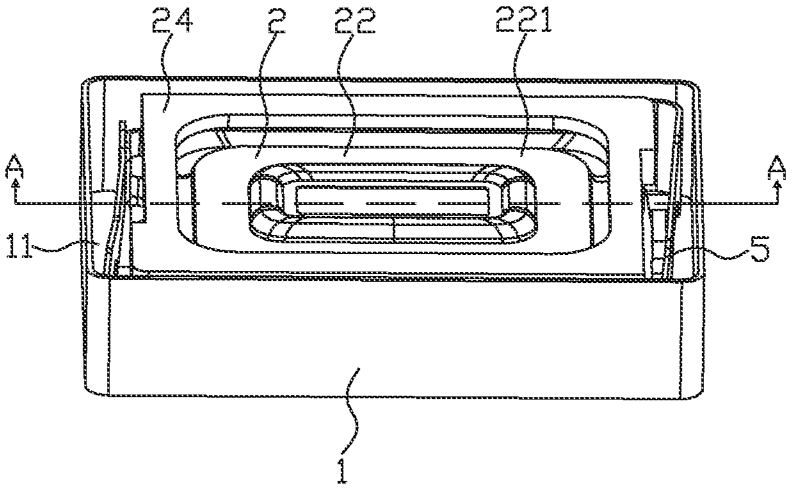
FIG. 1 is an overall structural schematic diagram of a multifunctional sound device according to one embodiment of the present disclosure.

The present disclosure is further described below with reference to the accompanying drawings and embodiments.

As shown in FIGS. 1-6, the present disclosure provides the multifunctional sound device, including a housing 1, a sound unit 2, a vibrator 3, and coils 4. The housing 1 includes an accommodating cavity 11, and the sound unit 2 is accommodated in the accommodating cavity 11 and is fixedly connected to the housing 1. The sound unit 2 includes a frame 21, a vibration system 22, and a magnetic circuit system 23. The vibration system 22 is disposed in the frame 21, and the magnetic circuit system 23 drives the vibration system 22 to reciprocally vibrate and generate sound along a first direction. The vibrator 3 is suspended in the accommodating cavity 11 and disposed on one side, distal from the vibration system 22, of the magnetic circuit system 23, and the coils 4 are assembled to the vibrator 3. The magnetic circuit system 23 interacts with the coils 4 to drive the vibrator 3 to vibrate in a second direction and a third direction, the second direction is perpendicular to the third direction, and the second direction and the third direction are perpendicular to the first direction. The sound unit 2 and the vibrator 3 are assembled in the housing 1 and share one magnetic system 23, which saves space and greatly reduces occupied space. Moreover, the magnetic circuit system 23 interacts with the coils 4 to drive the vibrator 3 to vibrate in the second direction and the third direction, thereby enhancing vibration effect.

Figure 2:
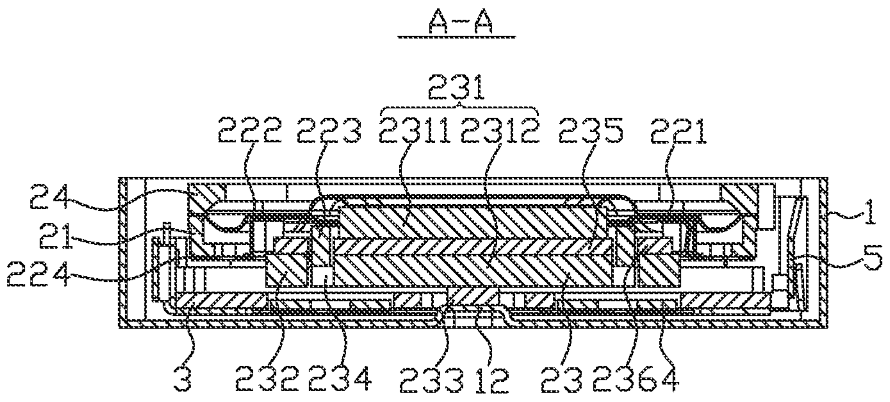
FIG. 2 is a cross-sectional schematic diagram taken along the line A-A shown in FIG. 1.
Figure 4:
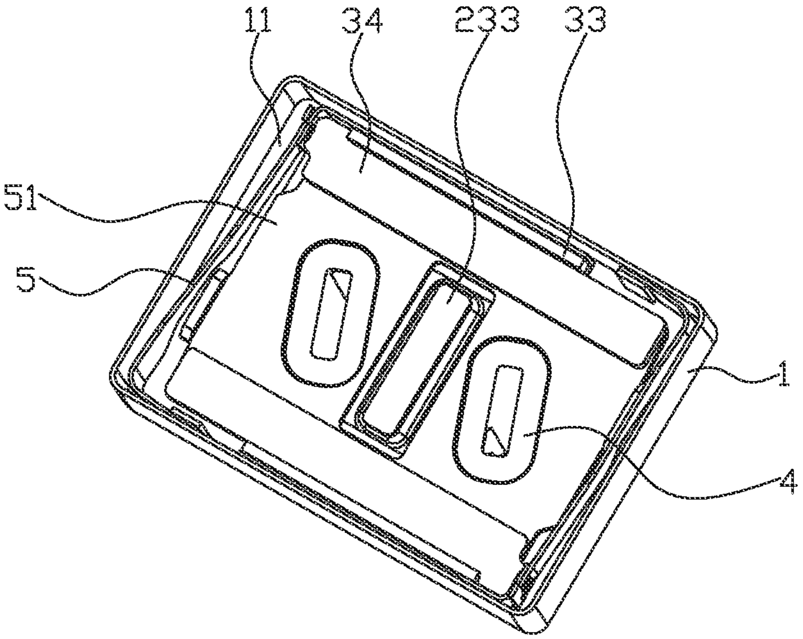
FIG. 4 is a schematic diagram of an assembly relationship of elastic components, a vibrator, and a housing in the multifunctional sound device according to one embodiment of the present disclosure.
Figure 6:
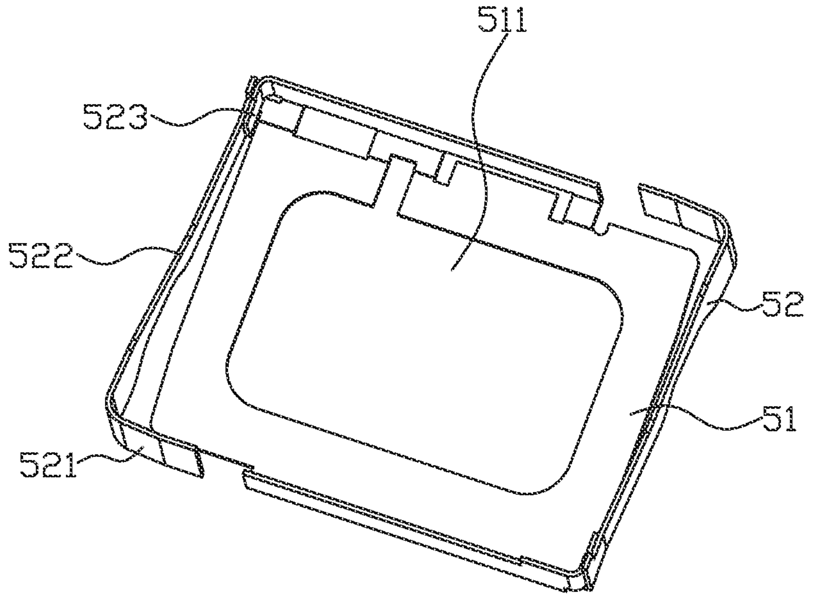
FIG. 6 is a structural schematic diagram of elastic components in the multifunctional sound device according to one embodiment of the present disclosure.

As shown in FIGS. 2, 4, and 6, furthermore, the multifunctional sound device further includes elastic components 5, and the elastic components 5 are respectively connected to the vibrator 3 and the housing 1. Each of the elastic components 5 includes a bearing portion 51 and two elastic portions 52, the bearing portion 51 bears the vibrator 3, and the two elastic portions 52 are fixedly connected to the bearing portion 51. The two elastic portions 52 are respectively disposed at two opposite ends of the vibrator 3, and the two elastic portions 52 are elastically deformed when the vibrator 3 vibrates. Specifically, the bearing portion 51 bear the vibrator 3, so that the vibrator 3 is suspended in the housing. The two elastic portions 52 are symmetrically disposed at the two opposite ends of the vibrator 3, so that the vibrator 3 elastically deforms the two elastic portions 52 when vibrating in the second direction and the third direction, and the two elastic portions 52 may be axisymmetric and centrosymmetric. Furthermore, the two elastic portions 52 are centrosymmetrically disposed at both ends of the vibrator 3, and torsional force on the elastic components 5 is reduced compared with that the two elastic portions 52 are symmetrically disposed, which further reduces vibration resistance. According to actual needs, the elastic components 5 may be compression springs, elastic sheets, etc.

As shown in FIGS. 4 and 6, in one embodiment, each of the elastic portions 52 includes a first connecting arm 521, a second connecting arm 522, and a third connecting arm 523. The first connecting arm 521 is fixedly connected to the housing 1, the second connecting arm 522 is fixedly connected to the vibrator 3, and two ends of the third connecting arm 523 are respectively and fixedly connected to the first connecting arm 521 and the second connecting arm 522. The first connecting arm 521, the second connecting arm 522, and the third connecting arm 523 surround a periphery of the vibrator 3. The third connecting arm 523 is obliquely disposed in a gap between the vibrator 3 and the housing 1.

Figure 3:
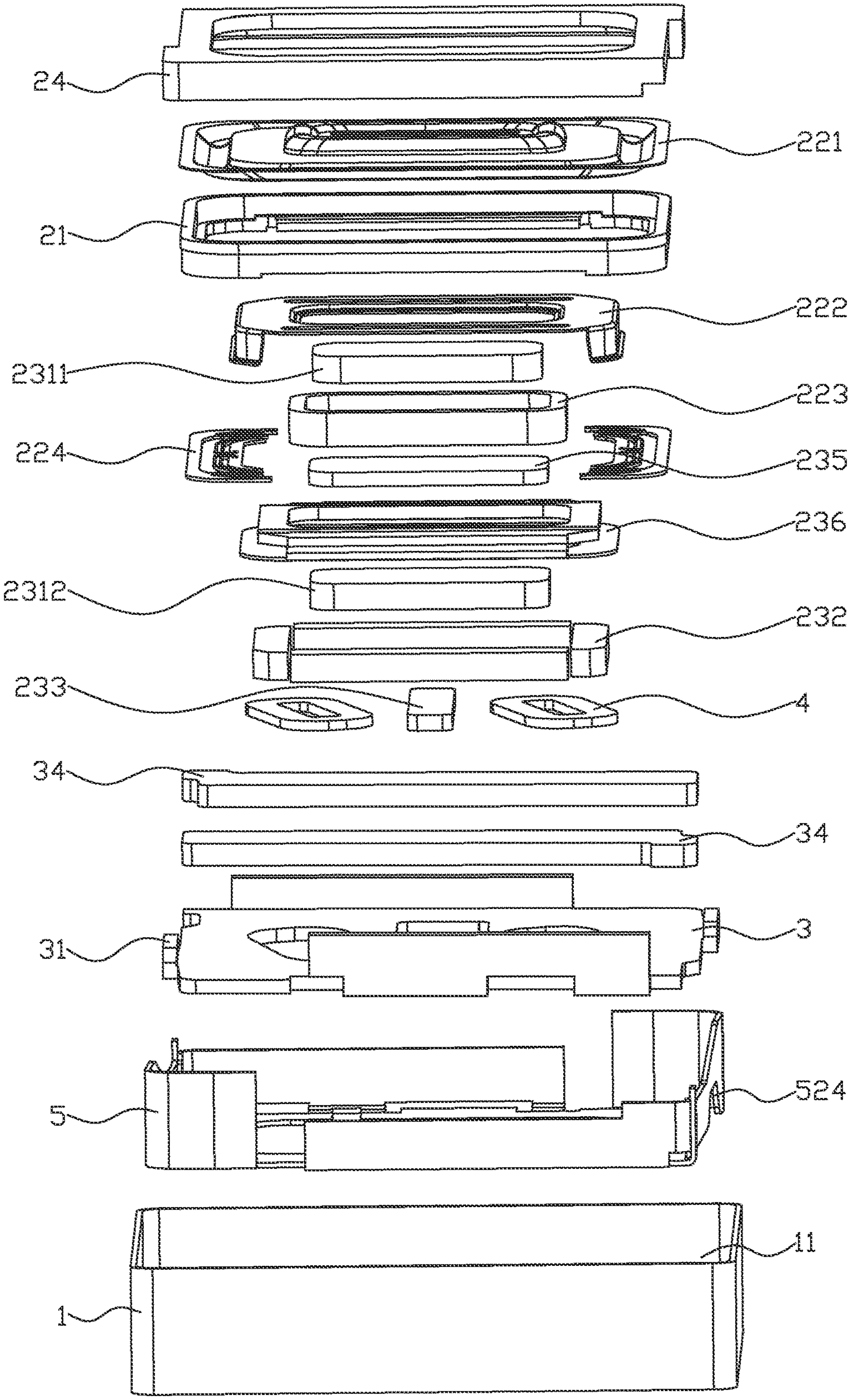
FIG. 3 is a three-dimensional exploded structural schematic diagram of the multifunctional sound device according to one embodiment of the present disclosure.

As shown in FIG. 3, furthermore, avoidance holes 524 are respectively defined on the elastic portions 52. Impact portions 31 are disposed on the vibrator 3, where the impact portions 31 are matched with the avoidance holes 524. The impact portions 31 pass through the avoidance holes 524. Specifically, the avoidance holes 24 are defined at the third connecting arm 523, namely one end of the third connecting arm 523 close to the first connecting arm 521, and when vibration amplitude of the vibrator 3 is large, the impact portions 31 pass through the avoidance holes 524 to impact the housing 1 to limit the vibration amplitude of the vibrator 3.

As shown in FIGS. 2-5, in one embodiment, a first avoiding hole 511 is defined on the bearing portion 51, and a second avoiding hole 321 is defined on the vibrator 3, where the second avoiding hole 321 is disposed opposite to the first avoiding hole 511. The magnetic circuit system 23 includes a primary magnet 231 and a secondary magnet 232, the primary magnet 231 is connected to the vibration system 22, and the secondary magnet 232 is spaced apart from the primary magnet 231 to form a magnetic gap 234. The magnetic gap 234 is defined between the primary magnet 231 and the secondary magnet 232.

A supporting portion 12 is formed through protruding from the housing 1 toward a direction of the vibrator 3, and the supporting portion 12 sequentially penetrates through the first avoiding hole 511 and the second avoiding hole 321 and is fixed to the magnetic circuit system 23. Furthermore, the multifunctional sound device further includes a fixing component 233, the fixing component 233 is accommodated in the second avoiding hole 321. The supporting portion 12 is fixed to one side, close to the vibrator 3, of the primary magnet 231 through the fixing component 233, thereby fixing the magnetic circuit system 23 to the housing 1.

Figure 5:
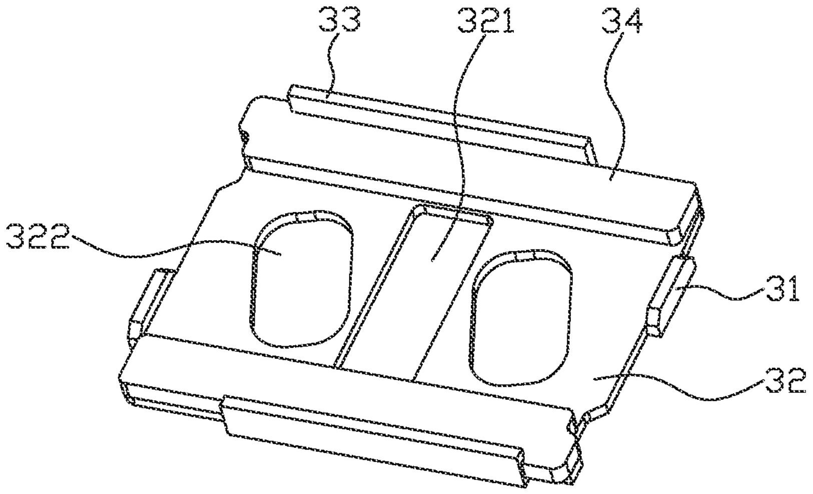
FIG. 5 is a structural schematic diagram of the vibrator in the multifunctional sound device according to one embodiment of the present disclosure.

As shown in FIGS. 4-5, in one embodiment, a number of the coils 4 is two. The vibrator 3 includes a main body portion 32, two side wall portions 33, and two mass blocks 34. The main body portion 32 is assembled to the bearing portion 51, the two side wall portions 33 are fixed at two opposite ends of the main body portion 32, and the two mass blocks 34 are fixedly connected to the main body portion 32. The two mass blocks 34 are disposed at intervals between the two side wall portions 33. The impact portions 31 are fixed to a side edge, adjacent to the two side wall portions 33, of the main body portion 32. Two mounting grooves 322 are defined on the main body portion 32 at intervals, and the two mounting grooves 322 are disposed at two opposite sides of the second avoiding hole 321. The coils 4 are one-to-one disposed in the two mounting grooves 322, and the coils 4 are mounted in the two mounting grooves 322. Specifically, the main body portion 32 may be a flat plate, a central axis of the main body portion 32 is taken as a symmetry axis for symmetrically arranging the two mass blocks 34 and the two side wall portions 33, so that vibration effect of the vibrator 3 is improved. The two mass blocks 34 may increase motion inertia of the vibrator 3, which provides better vibration effect. The two mounting grooves 322 may limit relative moment between the coils 4 and the main body portion 32, and reduce occupied space of the vibrator 3.

As shown in FIGS. 2-4, furthermore, the coils 4 are racetrack-shaped coils 4, and included angles respectively exist between an extension direction of a long edge of each of the coils 4 with the second direction and the extension direction of the long edge of each of the coils 4 with the third direction. The coils 4 are opposite to the magnetic gap 324 and are spaced apart from the magnetic gap 324 along the first direction. The coils 4 are obliquely disposed so as to interact with the magnetic circuit system 23 to drive the vibrator 3 to vibrate along the second direction and the third direction to further achieve bi-directional vibration of the vibrator 3.

As shown in FIGS. 2-3, in one embodiment, furthermore, the primary magnet 231 includes an upper magnet 2311 and a lower magnet 2312 opposite to the upper magnet 2311, and magnetic poles of ends, close to each other, of the upper magnet 2311 and the lower magnet 2312 are the same. The magnetic circuit system 23 further includes a primary pole core 235 and a secondary pole core 236, two sides of the primary pole core 235 are respectively and fixedly connected to the upper magnet 2311 and the lower magnet 2312, and the secondary pole core 236 is respectively and fixedly connected to the frame 21 and the secondary magnet 232. A magnetic pole direction of the secondary magnet 232 is opposite to a magnetic pole direction of the lower magnet 2312, and the magnetic pole direction of the secondary magnet 232 is the same as a magnetic pole direction of the upper magnet 2311. Specifically, an upper end of the upper magnet 2311 is south pole, a lower end of the upper magnet 2311 is north pole, an upper end of the lower magnet 2312 is south pole, a lower end of the lower magnet 2312 is north pole, an upper end of the secondary magnet 232 is south pole, and a lower end of the secondary magnet 232 is north pole. The upper magnet 2311 and the lower magnet 2312 are fixedly connected through the primary pole core 235, the lower magnet 2312 is fixedly connected to the fixing component 233, the secondary magnet 232 is fixedly connected to the secondary pole core 236, and the secondary pole core 236 is fixedly connected to the frame 21. Furthermore, a height of the secondary magnet 232 is consistent with a height the lower magnet 2312.

As shown in FIGS. 2, 3, and 6, in one embodiment, the vibration system 22 includes a vibrating diaphragm 221, a dome frame 222, and a voice coil 223, the vibrating diaphragm 221 is connected to the frame 21, the dome frame 222 is connected to the vibrating diaphragm 221, and the voice coil 223 is inserted into the magnetic gap 231 and is connected to the dome frame 222. Specifically, the vibrating diaphragm 221 includes a dome, a first folding ring, and a second folding ring, the first folding ring is connected to an inner side of the dome and dent toward a direction distal from the magnetic circuit system 23, and the second folding ring is connected to an outer side of the dome and is bent toward a direction close to the magnetic circuit system 23. Both the first folding ring and the second folding ring are annular, an inner edge of the first ring is fixed to the primary magnet 231, and an outer edge of the second folding ring is fixed to the frame 21.

Specifically, the sound unit 2 further includes an upper cover 24 and flexible circuit boards 224, the upper cover 24 is disposed on one side, distal from the magnetic circuit system 23, of the frame 21, and two ends of each of the flexible circuit boards 24 are respectively and fixedly connected to the frame 21 and the dome frame 222. The upper cover 24 is matched with the frame 21, the second folding ring is disposed between the frame 21 and the upper cover 24, and the vibrating diaphragm 221 is clamped and fixed through the frame 21 and the upper cover 24. The flexible circuit boards 224 are disposed on one side, distal from the upper cover 24, of the frame 21. The sound unit 2 includes two flexible circuit boards 224, which is beneficial for symmetrical arrangement of the vibration system 22, thereby improving vibration effect of the vibration system 22. It should be understood that circuit where the voice coil 223 and the coils 4 are located are independent from each other, so that the voice coil 223 and the coils 4 may separately or simultaneously work, and requirements that whether the coil 4 and the voice coil 223 work or not in different application scenarios may be satisfied.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A multifunctional sound device, comprising:

a housing;

a sound unit;

a vibrator; and coils;

wherein the housing comprises an accommodating cavity, and the sound unit is accommodated in the accommodating cavity and is fixedly connected to the housing; the sound unit comprises a frame, a vibration system, and a magnetic circuit system; the vibration system is disposed in the frame, and the magnetic circuit system drives the vibration system to reciprocally vibrate and generate sound along a first direction, where the magnetic circuit system comprises a magnetic gap; the vibrator is suspended in the accommodating cavity and disposed on one side, distal from the vibration system, of the magnetic circuit system, and the coils are assembled to the vibrator; the magnetic circuit system interacts with the coils to drive the vibrator to vibrate in a second direction and a third direction, the second direction is perpendicular to the third direction, and the second direction and the third direction are perpendicular to the first direction;

wherein the multifunctional sound device further comprises elastic components, and the elastic components are respectively connected to the vibrator and the housing; each of the elastic components comprises a bearing portion and two elastic portions, the bearing portion bears the vibrator, and the two elastic portions are fixedly connected to the bearing portion; the two elastic portions are respectively disposed at two opposite ends of the vibrator, and the two elastic portions are elastically deformed when the vibrator vibrates.

2. The multifunctional sound device according to claim 1, wherein each of the elastic portions comprises a first connecting arm, a second connecting arm, and a third connecting arm; the first connecting arm is fixedly connected to the housing, the second connecting arm is fixedly connected to the vibrator, and two ends of the third connecting arm are respectively and fixedly connected to the first connecting arm and the second connecting arm; the first connecting arm, the second connecting arm, and the third connecting arm surround a periphery of the vibrator.

3. The multifunctional sound device according to claim 1, wherein avoidance holes are respectively defined on the elastic portions; impact portions are disposed on the vibrator, where the impact portions are matched with the avoidance holes; and the impact portions pass through the avoidance holes when the vibrator vibrates.

4. The multifunctional sound device according to claim 1, wherein a first avoiding hole is defined on the bearing portion, and a second avoiding hole is defined on the vibrator, where the second avoiding hole is disposed opposite to the first avoiding hole; a supporting portion is formed through protruding from the housing toward a direction of the vibrator, and the supporting portion sequentially penetrates through the first avoiding hole and the second avoiding hole and is fixed to the magnetic circuit system.

5. The multifunctional sound device according to claim 4, wherein the multifunctional sound device further comprises a fixing component, the fixing component is accommodated in the second avoiding hole, and the supporting portion is fixed to the magnetic circuit system through the fixing component.

6. The multifunctional sound device according to claim 4, wherein a number of the coils is two; the vibrator comprises a main body portion, two side wall portions, and two mass blocks; the main body portion is assembled to the bearing portion, the two side wall portions are fixed at two opposite ends of the main body portion, and the two mass blocks are fixedly connected to the main body portion; the two mass blocks are disposed at intervals between the two side wall portions, two mounting grooves are defined on the main body portion at intervals, and the two mounting grooves are disposed at two opposite sides of the second avoiding hole; the coils are one-to-one disposed in the mounting grooves.

7. The multifunctional sound device according to claim 4, wherein the magnetic circuit system comprises a primary magnet and a secondary magnet, the secondary magnet is spaced apart from the primary magnet; the primary magnet comprises an upper magnet and a lower magnet opposite to the upper magnet, and magnetic poles of ends, close to each other, of the upper magnet and the lower magnet are the same; the magnetic circuit system further comprises a primary pole core and a secondary pole core, two sides of the primary pole core are respectively and fixedly connected to the upper magnet and the lower magnet, and the secondary pole core is respectively and fixedly connected to the frame the secondary magnet; a magnetic pole direction of the secondary magnet is opposite to a magnetic pole direction of the lower magnet, and the magnetic pole direction of the secondary magnet is the same as a magnetic pole direction of the upper magnet.

8. The multifunctional sound device according to claim 1, wherein the coils are racetrack-shaped coils, and included angles respectively exist between an extension direction of a long edge of each of the coils with the second direction and the extension direction of the long edge of each of the coils with the third direction.

9. The multifunctional sound device according to claim 8, wherein the coils are opposite to the magnetic gap and are spaced apart from the magnetic gap along the first direction.

* * * * *